(12) United States Patent
Tehranipoor et al.

(10) Patent No.: US 11,030,737 B2
(45) Date of Patent: Jun. 8, 2021

(54) HARDWARE TROJAN SCANNER

(71) Applicant: UNIVERSITY OF FLORIDA RESEARCH FOUNDATION, INC., Gainesville, FL (US)

(72) Inventors: Mark M. Tehranipoor, Gainesville, FL (US); Haoting Shen, Tallahassee, FL (US); Nidish Vashistha, Gainesville, FL (US); Navid Asadizanjani, Gainesville, FL (US); Mir Tanjidur Rahman, Gainesville, FL (US); Damon Woodard, Newberry, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 143 days.

(21) Appl. No.: 16/573,922

(22) Filed: Sep. 17, 2019

(65) Prior Publication Data

US 2020/0090325 A1    Mar. 19, 2020

Related U.S. Application Data

(60) Provisional application No. 62/733,460, filed on Sep. 19, 2018.

(51) Int. Cl.
*G06T 7/00* (2017.01)
*G06T 5/40* (2006.01)
(Continued)

(52) U.S. Cl.
CPC .......... *G06T 7/0008* (2013.01); *G06K 9/6267* (2013.01); *G06T 5/40* (2013.01); *G06T 7/136* (2017.01); *G06T 2207/30148* (2013.01)

(58) Field of Classification Search
CPC ........ G06T 7/0008; G06T 5/40; G06T 7/136; G06T 2207/30148; G06T 2207/10061;
(Continued)

(56) References Cited

U.S. PATENT DOCUMENTS

2011/0002528 A1*   1/2011   Bajura ................... G06T 7/001
                                                            382/145

OTHER PUBLICATIONS

Wang, Xiaoxiao, Mohammad Tehranipoor, and Jim Plusquellic. "Detecting malicious inclusions in secure hardware: Challenges and solutions." 2008 IEEE International Workshop on Hardware-Oriented Security and Trust. IEEE, 2008. (Year: 2008).*

(Continued)

*Primary Examiner* — Amandeep Saini
(74) *Attorney, Agent, or Firm* — Alston & Bird LLP

(57) ABSTRACT

A method of detecting hardware Trojans in an IC includes providing a golden IC layout data set or SEM image data taken at long dwelling time on an active area of the golden IC after polishing it from the backside. Next, the IC under authentication (IUA) sample is prepared for fast SEM imagining (shorter dwelling time) after backside thinning. Next step is to perform image processing on the IUA's SEM image, which includes histogram equalization with noise filtering using Gaussian and Median filters. In the last step, the IUA sample data with the shorter dwelling time is compared with the golden IC layout data or the golden image data from high quality (longer dwelling time) SEM scanning process. At the end the result of the comparison is used to identify hardware Trojans.

18 Claims, 4 Drawing Sheets

(51) Int. Cl.
    *G06K 9/62* (2006.01)
    *G06T 7/136* (2017.01)
(58) Field of Classification Search
    CPC .......... G06T 2207/20081; G06T 7/001; G06K 9/6267; G06K 9/6212; G06K 9/40; G06K 9/4642
    USPC ........................................................ 382/147
    See application file for complete search history.

(56) References Cited

OTHER PUBLICATIONS

Zhou, Boyou, et al. "Detecting hardware trojans using backside optical imaging of embedded watermarks." 2015 52nd ACM/EDAC/IEEE Design Automation Conference (DAC). IEEE, 2015. (Year: 2015).*

Courbon, Franck et al. *A High Eficiency Hardware Trojan Detection Technique Based On Fast SEM Imaging*, In Proceedings of the 2015 Design, Automation & Test in Europe Conference & Exhibition. EDA Consortium, 2015, pp. 788-793.

Vashistha, Nidish et al. *Detecting Hardware Trojans Inserted by Untrusted Foundry Using Physical Inspection and Advanced Image Processing Techniques*, Journal of Hardware System and Security (HaSS), Dec. 1, 2018, vol. 2, Issue 4, pp. 333-344.

Wang, Zhou et al. Image Quality Assessment: From Error Visibility To Stuctural Similarity, IEEE Transactions On Image Processing, Apr. 2004, vol. 13, No. 4, pp. 600-612.

Courbon, Franck et al. *SEMBA: A SEM Based Acquisition Technique For Fast Invasive Hardware Trojan Detection*, In 2015 European Conference On Circuit Theory and Design (ECCTD), Aug. 24, 2015, pp. 1-4, IEEE.

* cited by examiner

HARDWARE TROJAN SCANNER

CROSS-REFERENCE TO RELATED APPLICATIONS

This application claims the benefit of U.S. Provisional Patent Application Ser. No. 62/733,460, filed on Sep. 19, 2018, which is incorporated herein by reference in its entirety, including any figures, tables, and drawings.

TECHNICAL FIELD

The present application relates to data security and privacy in integrated circuits (IC), and in particular, to a technique for detecting hardware Trojans in ICs.

BACKGROUND

While the globalization of IC fabrication process has accelerated innovation, outsourcing of IC fabrication has created a trust issue between an IC design house and an IC foundry because of the IC foundry's full access to the GDSII layouts, net-lists and test vectors. This trust issue has opened up a door to different kinds of security and piracy threats such as, hardware Trojan insertion, IP threats, production of out-of-specification or defective ICs. Hardware Trojan insertion by an untrusted foundry is one of the most serious security threats that has been discussed the most in the hardware security community.

A hardware Trojan is a malicious modification of an IC. Such a malicious modification can cause a failure of the IC and can lead to leaking of sensitive information. Hardware Trojans (hereinafter alternatively referred to as Trojans) can pose significant threats to IoT (internet of things) devices, home automation devices, security cameras, locks, or civilian applications such as aviation, space, and health care. Most importantly, the nation's military and law enforcement database can be vulnerable.

A Trojan can be inserted into unused spaces in an IC during mask fabrication. For example, a Trojan can replace a de-coupling MOS capacitor or an existing filler cell. A Trojan can be created by re-sizing an existing cell or by thinning an interconnect, thereby causing an early failure (e.g., denial of service attacks). Unlike most Trojans, a reliability Trojan is known not to leave a footprint at the replaced active layer of the IC.

In accordance with conventional anti-Trojan and Trojan detection techniques, run-time or test time monitoring can be used to detect the hardware Trojans. However, such techniques have serious limitations. For example, the run-time monitoring technique often consumes CPU usage, extra power, extra memory, or additional silicon area. Test time techniques like logic testing methods cannot easily detect large Trojans because it is often difficult to generate test vectors that trigger the Trojans. In addition, side channel analysis is vulnerable to circuit noise and hence cannot detect small size Trojans. Therefore, the confidence levels in detecting Trojans using the above-mentioned techniques are quite low, especially for those ICs used in critical civilian infrastructure, military and aerospace.

Another known technique for detecting Trojans is to reverse engineer the ICs to reconstruct the circuit net-list. This destructive test is expensive and slow, especially sometimes it requires repeating try on numerous ICs since many of the ICs are destroyed in the process from inaccuracies in sample preparation, delayering process or Scanning Electron Microscope (SEM) imaging process.

Besides the above-mentioned challenges, conventional Trojan detection techniques are not robust enough to fend off the next generation Trojans like the stealthy dopant level hardware Trojans. Hence an improved Trojans detection technique which is reliable and fast is needed.

BRIEF SUMMARY

Embodiments of the present invention provide a method of detecting hardware Trojans in an IC. The method includes: first provide a first image from a golden layout (Trojan free) data set or a high quality SEM image taken at a longer dwelling time from a Trojan-free sample of the IC, also called golden IC (depends on the availability); second, prepare a target sample, i.e. IC under authentication (IUA) sample, polishing it at backside to a predetermined thickness for SEM Imaging. Next, a second SEM image of the target IC is captured from its back side at a second dwelling time; wherein the second dwelling time is lower than the first one. Then first and second images at sample level are aligned by using image registration technique. The captured second SEM image is enhanced for increased feature detection. If a golden IC SEM image is used, it needs image enhancement as well, as mentioned in previous step. Next step is to extract features from the two images. These extracted features are compared with the first SEM image by applying an image-analysis algorithm to detect changes, these changes can possibly be a hardware Trojan. At last, a change detection map is produced by grouping regions suspected of having hardware Trojans.

Enhancing the extracted image includes applying a histogram equalization method for adjusting image intensity to enhance contrast.

Next, the second image is further smoothened by image filtering, for example by a Gaussian filter or a median filter to remove any high frequency noise while preserving edges of the features.

Next step is segmenting the SEM images. Using an adaptive thresholding-based segmentation returns a binary image as an output and provides an improved contrast between a doped area (foreground features) in an active region from a dark background area on the IC.

Next, comparing the features from Golden layout image (or high quality SEM image of the golden IC) with the features from SEM image of IUA. The feature comparison can be performed pixel to pixel or at a feature descriptor level. A change detection map will be generated based on the location of changes detected.

Optionally, the second image is applied a flood fill operation to remove white holes from false positive Trojans generated during image comparison.

If a dataset of trusted features in an active region is available, malicious change can be detected using artificial intelligence-based algorithms like machine learning (ML) classifiers. These ML classifiers are applied to compare the second image (IUA image) with the first image (golden layout image) to eliminate false positives in the hardware Trojan map.

DETAILED DESCRIPTION

Various embodiments of the present invention now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

A Trojan detection technique, in accordance with one embodiment of the present invention, includes, in part, (i) preparing sample during which the backside of the IC is thinned, (ii) capturing an SEM image of the backside of thinned sample, and (iii) processing the images thereby to enhance their quality so as to enable the detection of any changes (insertions, deletions & modifications) between a golden IC (or layout design) and IC under authentication (IUA) SEM image.

Figure 1:
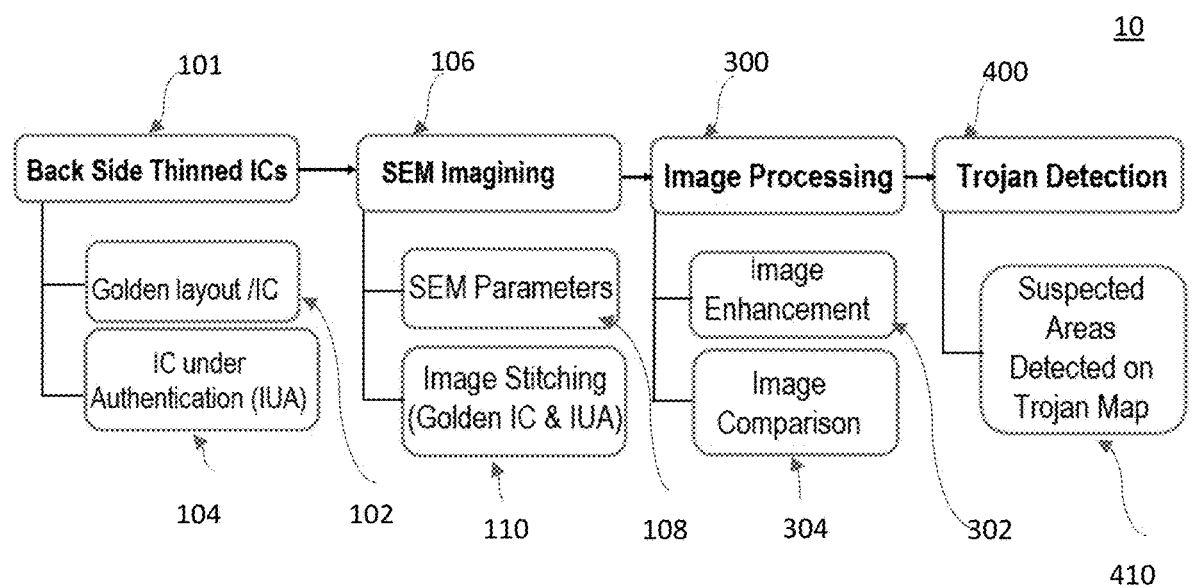
FIG. 1 shows a flow chart for detecting hardware Trojans, according to an embodiment of the current disclosure.

FIG. 1 is a flowchart 10 for detecting hardware Trojans, according to some embodiments of the present invention. The flowchart includes primarily four steps. The first step 101 is preparing the IC sample for SEM imaging and analysis.

First an IC under authentication (IUA) chip 104 is identified for Trojan detection, a golden layout or IC sample 102 is selected as the standard. Trojan detection is achieved by eventually comparing images of the golden IC layout/SEM with those of the IUA. In FIG. 1 at step 101, the packaged IC die is first de-capsulated either by using mechanical polishing or wet aching (fuming nitric acid) to expose the backside of the die, in accordance with embodiments of the present invention. The exposed die is often relatively thick (around 300-350 µm) which inhibits the SEM's electron beam penetration into the substrate even at 30 kV beam voltage of SEM. The de-capsulated die is therefore made thinner (~1-2 µm) using a fine polisher at the die backside. The die can be further thinned using a plasma based etching techniques. The golden layout or IC sample 102 refers to an IC die without any Trojans. An IUA chip 104 refers to the target chip or IC for Trojan detection.

After the IUA sample is prepared for data acquisition, step 106 performs SEM imaging from the backside of the thinned IUA sample using a SEM to image up to a resolution of ~10 nm or a Helium ion-based microscopy for sub-10 nm, this sample's critical dimension may depend on the current advancement of the instrument. If a golden IC layout is not available, a high-quality image captured from the active regions of the IC chip may be used as a golden IC image. The golden IC SEM image is captured only once and will be used as a reference image to compare with IUA images to detect Trojans. Images taken from the backside of the thinned IUAs have lower quality than the image of the golden IC sample, thus IUA images take less time to capture, thus in turn, making the hardware Trojan detection process faster. The time required to capture the high-quality SEM images depends on a number of SEM's microscopic parameters 108, such as the beam voltage, field of view (magnification), dwelling time and resolution. The IC chip size is much larger than the imaging field size, so the acquired SEM images of golden IC 102 and IUA 104 must be aligned and stitched respectively together at 110.

Step 300 compares the IUA images and the golden IC images. Before applying an image-processing algorithm to detect Trojan caused changes, the raw golden IC and IUA images are first aligned at sample level by using image registration settings. Then the two sets of images are enhanced at 302 for increased feature detection. After registration, the images are filtered to remove high frequency noise components. Thereafter, the images are segmented to separate the active regions foreground features from dark background area.

The image contrast varies from auto-focus and auto-contrast performed by SEM during the full die imaging process. An adaptive Thresholding (after histogram equalization) method can be applied to segment the SEM images. Adaptive Thresholding based segmentation returns a binary image as the output and provides an improved contrast between the active region features and the dark background of the image. Such features can be further smoothened by using image analysis filter that preserves the IC structure edges and removes high frequency data. For example, a Gaussian filter reduces image noise, enhance features by smoothening, and a nonlinear filter such as the median filter that removes noise but preserves feature edges in the active region in the SEM image of an IC.

During the image enhancement 302, some of the pixel data may be lost, resulting in the creation of relatively small white holes. The holes may create false positives (falsely detected Trojans) during image comparison detection at 304. Accordingly, the holes so created are filled using a flood fill operation to remove false positives.

After the image enhancement is performed at 302 on both golden IC and IUA images, as described above, the two sets of images are compared at 304 by a customized state-of-the art image analysis technique, such as the commercially available Structural SIMilarity (SSIM) software or a feature descriptor comparison.

Step 400 completes the Trojan detection. A Trojan heat map is generated to label the area(s) of suspicion at 410 and identifies the Trojans based on the SSIM Index obtained at 304. Using data sets from different images, a machine learning (ML) based model (artificial intelligence) may remove any false positives generated as a result of any noise or any variation that may be present during the image acquisition, or otherwise caused by statistical process variations and/or foundry manufacturing defects. An ML based model can be trained based on the data set of trusted active region features. For example, a one-versus-all support vector machine (OVA-SVM) maybe introduced. Another identifying model addresses the classification problem between Trojan vs non-Trojan features using the non-linear data set. If the identification is not successful, higher quality images from the area on IUA may be captured for further analysis of the hardware Trojans.

The benefits of this technique include, among other things: 1) faster speed, because it needs only hours to a few days to complete the four steps described above, as compared to full reverse engineering which may take weeks and months; 2) economical, usually only a few chips, likely less than 5 are necessary, as compared to earlier proposed full reverse engineering which costs around 20-50 chips; 3)

simpler, because it does not depend on the functionality of the circuit and there is no need to extract complete netlist of the circuit to detect a hardware Trojan, as compared to electrical or side channel analysis testing; and 4) more reliable than electrical test such as logic testing and side channel analysis, because it does not need to create patterns to trigger Trojans or looks for weak side channel signals, which may be suppressed by circuit's own noise so may become nondetectable.

FIGS. 2A-2E illustrate a sequence of exemplary images in identifying a hardware Trojan, according to an embodiment of the current disclosure.

Figure 2A:
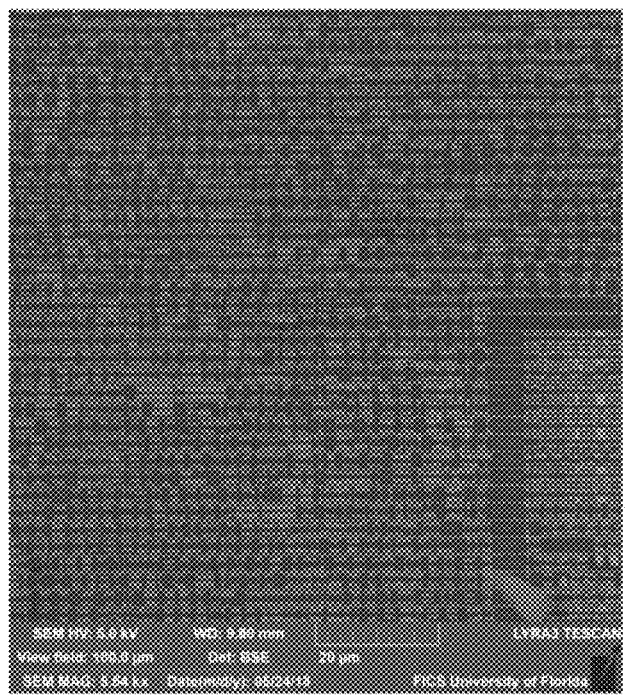
FIG. 2A shows a Golden IC layout or SEM image captured at a relatively longer dwelling time.

FIG. 2A shows an exemplary Golden IC SEM image captured at a relatively longer dwelling time, with 5.54 magnification, excited at 5.0 kV voltage and having 100 μm field of view.

Figure 2B:
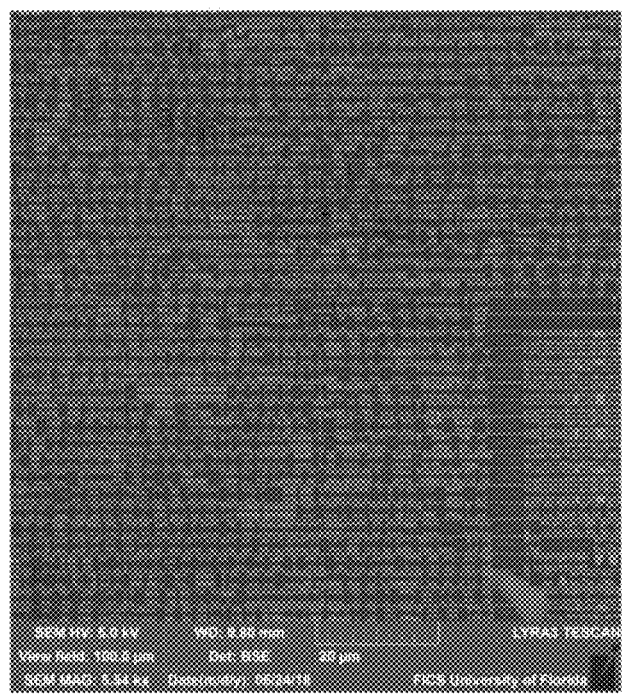
FIG. 2B illustrates an IUA image taken at a dwelling time lower than the dwelling time of FIG. 2A.

FIG. 2B shows an IUA SEM image taken at 5.0 kV and 5.54 magnification in 100 μm field of view, its dwelling time is shorter than of FIG. 2A.

Figure 2C:
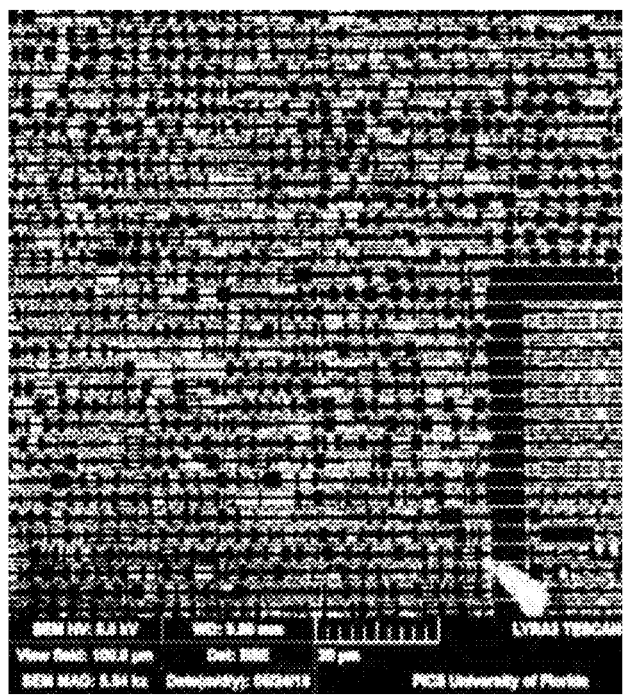
FIG. 2C illustrates an enhanced golden image of FIG. 2A after being filtered.

FIG. 2C illustrates an enhanced golden image of FIG. 2A post filtering using Binary and Gaussian filters.

Figure 2D:
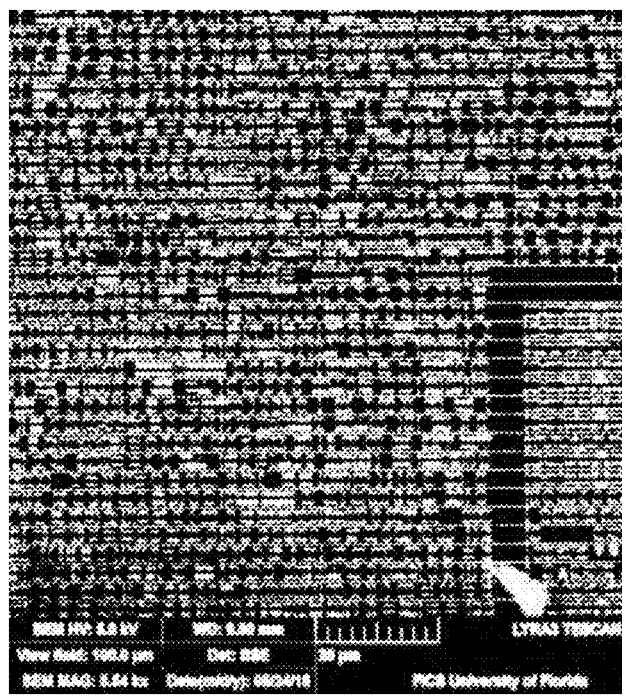
FIG. 2D illustrates an enhanced IUA image of FIG. 2B.

FIG. 2D illustrates an enhanced IUA image of FIG. 2B post filtering using Binary and Gaussian filters.

Figure 2E:
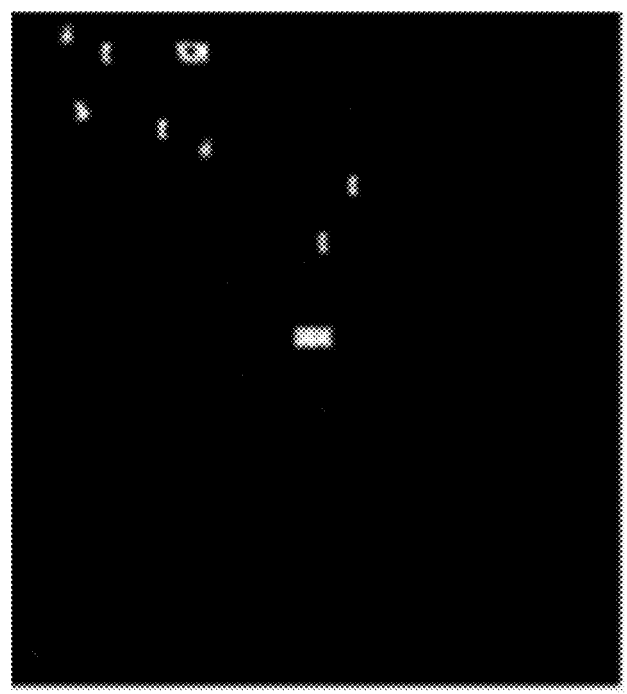
FIG. 2E shows areas in the IUA identified having Trojans after comparing FIGS. 2C and 2D.

FIG. 2E shows areas in the IUA SEM image identified having Trojans after comparing the golden IC image in FIG. 2C and the enhanced IAU image in FIG. 2D. The highly suspected areas popped up after the differences are detected by image analysis.

The above embodiments of the present invention are illustrative and not limitative. There are other non-pixel-based comparisons (e.g. Fourier descriptors) can be used to detect a difference between a golden IC image and the IUA image. Other modifications and variations will be apparent to those skilled in the art and are intended to fall within the scope of the appended claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of detecting hardware Trojans in an integrated circuit (IC), the method comprising:
providing a first Scanning Electron Microscope (SEM) image at a first dwelling-time on SEM, wherein the first SEM image is taken from a Trojan-free sample of the IC;
providing a target sample of the IC;
thinning a backside of the target sample to a predetermined thickness;
capturing a second SEM image of the target IC from its back side at a second dwelling-time, wherein the second dwelling time is shorter than the first dwelling time;
aligning the first SEM image and second SEM image at sample level by using image registration settings;
enhancing the captured second SEM image for increased feature detection;
comparing the enhanced second SEM image with the first SEM image by applying an image-processing algorithm to detect Trojan-caused-changes; and
producing a hardware Trojan map by grouping regions suspected of having hardware Trojans.

2. The method of claim 1, wherein the target sample comprises polysilicon layer, metal layers and doped regions.

3. The method of claim 1, wherein the enhancing the second SEM image comprises: applying a histogram equalization to enhance contrast; and filtering the captured second SEM image with a Gaussian filter and a median filter to remove high frequency noise.

4. The method of claim 3, wherein the second SEM image is a segmentation image based on adaptive thresholding.

5. The method of claim 1, wherein the comparing is achieved using software to generate a comparison index for every pixel to search areas of differences, and wherein the comparison index measures the similarities between the first SEM image and the second SEM image based on their structure and features.

6. The method of claim 1, wherein enhancing the second SEM image further comprises using a flood fill operation to remove white holes from false positive Trojans generated during image comparison.

7. The method of claim 1, wherein the applying an image-processing algorithm to detect Trojan-caused-changes comprises using machine learning models to compare the second SEM image with the first SEM image to eliminate false positives in the hardware Trojan map.

8. The method of claim 7, wherein the machine learning models comprise a machine learning classifier.

9. The method of claim 1, wherein thinning the target sample for SEM imaging comprises applying plasma etching.

10. The method of claim 2, wherein a threshold-based segmentation technique is applied to generate a binary image to enhance contrast of features from dark background in the doped region.

11. A method of detecting hardware Trojans in an integrated circuit (IC), the method comprising:
providing a first image, wherein the first image is an image taken at a first dwelling time or a layout data set from a golden sample of the IC;
providing a target sample of the IC;
thinning a backside of the target sample to a predetermined thickness;
capturing a second image of the target IC, wherein the second image is a Scanning Electron Microscope (SEM) image from the back side at a second dwelling-time, wherein the second dwelling-time is shorter than the first dwelling-time;
aligning the first image and the second image at sample level by using image registration settings;
enhancing the captured second image for increased feature detection;
comparing the enhanced second image with the first image by applying an image-processing algorithm to detect Trojan-caused-changes; and
producing a hardware Trojan map by grouping regions suspected of having hardware Trojans.

12. The method of claim 11, wherein the second image is further smoothened by filtering the captured second image with a Gaussian filter and a median filter to remove high frequency noise.

13. The method of claim 11, wherein the comparing is achieved using software to generate a comparison index for every pixel to search areas of differences, and wherein the comparison index measures the similarities between the first image and the second image based on their structures.

14. The method of claim 11, wherein enhancing the second image further comprises using a flood fill operation to remove white holes from false positive Trojans generated during image comparison.

15. The method of claim 11, wherein the applying an image-processing algorithm to detect Trojan-caused-changes comprises using machine learning models to compare the second image with the first image to eliminate false positives in the hardware Trojan map.

16. The method of claim 11, wherein thinning the target sample for SEM imaging comprises applying plasma etching.

17. The method of claim 12, wherein the target sample comprises polysilicon layer, metal layers and doped regions.

18. The method of claim 17, wherein the thresholding-based segmentation technique is applied to generate a binary image to enhance contrast of features from dark background in the doped region.

* * * * *